Oct. 31, 1967 R. I. SCACE 3,350,611

GATE FIRED BIDIRECTIONAL SWITCH

Filed Feb. 4, 1965 2 Sheets-Sheet 1

ELECTRON CURRENT FLOW

HOLE CURRENT FLOW

INVENTOR:
ROBERT I. SCACE,

BY [signature]

HIS ATTORNEY.

Oct. 31, 1967 R. I. SCACE 3,350,611

GATE FIRED BIDIRECTIONAL SWITCH

Filed Feb. 4, 1965

2 Sheets-Sheet 2

INVENTOR:
ROBERT I. SCACE,

BY Urban H. Faubion

HIS ATTORNEY.

United States Patent Office 3,350,611
Patented Oct. 31, 1967

3,350,611
GATE FIRED BIDIRECTIONAL SWITCH
Robert I. Scace, Skaneateles, N.Y., assignor to General Electric Company, a corporation of New York
Filed Feb. 4, 1965, Ser. No. 430,425
9 Claims. (Cl. 317—235)

ABSTRACT OF THE DISCLOSURE

The gate electrode and gate firing region arranged so that they are in close proximity to the area of device main current conduction in the current paths for conduction in both directions through the device to reduce problems of lateral gate current flow and high gate voltage drops.

This invention relates to bidirectional semiconductor switches of the type which can be switched between two states of impedance, i.e., between a high impedance and a low impedance, for current conduction in both directions through the semiconductor device. More particularly, the invention relates to such devices wherein a gate or control electrode provides control for both parts of the output of an alternating power source applied between a pair of main device electrodes.

The three lead bidirectional semiconductor switch has become an important component in a wide variety of control applications. Such devices are described and claimed in a number of copending patent applications which are assigned to the assignee of the present application, e.g. Ser. No. 838,504 entitled, "Semiconductor Devices and Methods of Making Same," filed Sept. 8, 1959, in the name of Nick Holonyak, Jr., and Richard W. Aldrich; Ser. No. 331,776, now Patent No. 3,275,909, entitled, "Semiconductor Switch," filed Dec. 19, 1963, in the name of Frank W. Gutzwiller and Ser. No. 337,384, now Patent No. 3,213,354, entitled, "Semiconductor Switch," filed Jan. 13, 1964, in the name of Finis E. Gentry.

The three lead bidirectional switch is made an active element in circuit applications by connecting its two main current carrying terminals in the circuit to be controlled. With the switch in its "off" condition, it acts as a high impedance element; except for a small leakage current, the switch acts as an open circuit. When the switch is in its "on" condition, it presents a very low impedance (essentially a short circuit) to current. The current may be turned on for a voltage applied across its main terminals in either direction or in both directions. In other words, it may act as a high impedance element to current in both directions or a high impedance element to current in one direction and essentially a short circuit to current in the opposite direction or it may operate as a low impedance element to current in both directions. Further, the time during any half cycle of an alternating source at which the switch may be rendered conductive may be varied. The usual mechanism for rendering the switch conductive is to apply a voltage to introduce or extract current from a third lead or terminal (called the triggering or gate lead) which increases current flowing through the device and thereby renders the device conductive. This action is descriptively referred to as triggering the device or turning it on.

For bidirectional switches as contemplated here a single terminal (gate terminal) is used to turn the device on for current flow in either direction through the device. Thus, different carrier movements take place and different current paths are utilized for "turn on" for opposite directions of load current flow. This means that a different firing mode is utilized for opposite directions of current flow. As a consequence, it is difficult to obtain firing for both directions of current flow with the same magnitude of gate voltage and current. It is highly desirable that, for both directions of current conduction through the switch, the gate voltage and current to fire be similar. Accordingly, it is an object of the present invention to provide a means for rendering gate firing characteristics of a bidirectional semiconductor switch more nearly symmetrical for both directions of conduction.

A further problem with most bidirectional switch structure is that as the area of the pellet is increased to accommodate high values of current that can be controlled, the gate electrode becomes more remote from portions of the device which it must control. The attendant problems of lateral current flow and high voltage drops impose severe limitations on device designs and applications. Accordingly, it is an object of the present invention to provide a device configuration which allows the gate emitter and electrode to be brought into closer proximity with portions of the device where carrier movement must be instigated for triggering to take place and hence minimize such problems.

In carrying out the present invention a single three lead (three terminal) semiconductor device is provided which controls both polarities of the output of an alternating power source and in which problems of lateral gate current flow and high gate voltage drops are minimized by arranging the gate electrode and gate firing region so that it is in close proximity to the area of device main current conduction and the current paths for conduction in both directions through the device.

The features which are believed to be characteristic of the invention are set forth with particularity in the appended claims. The invention itself, however, both as to its organization and advantages thereof may best be understood by reference to the following description taken in connection with the accompanying drawings in which:

FIGURE 1 is a three-dimensional view of a bidirectional switch showing the top major face and two sides of a semiconductor pellet incorporating the present invention;

FIGURE 2 is a three-dimensional view of the semiconductor switch of FIGURE 1 showing the bottom major face and the other two sides (other than those shown in FIGURE 1);

FIGURE 3 is an exploded sectional three-dimensional view of the device of FIGURE 1 with the section taken along the III—III plane of FIGURE 1 and using the same projection as for FIGURE 1 and showing device current paths during one mode of device turn on;

FIGURE 4 is another three-dimensional view of the device of FIGURE 1 rotated ninety degrees about a vertical axis to show current paths for a second mode of device turn on;

Figures 1, 2, 3:
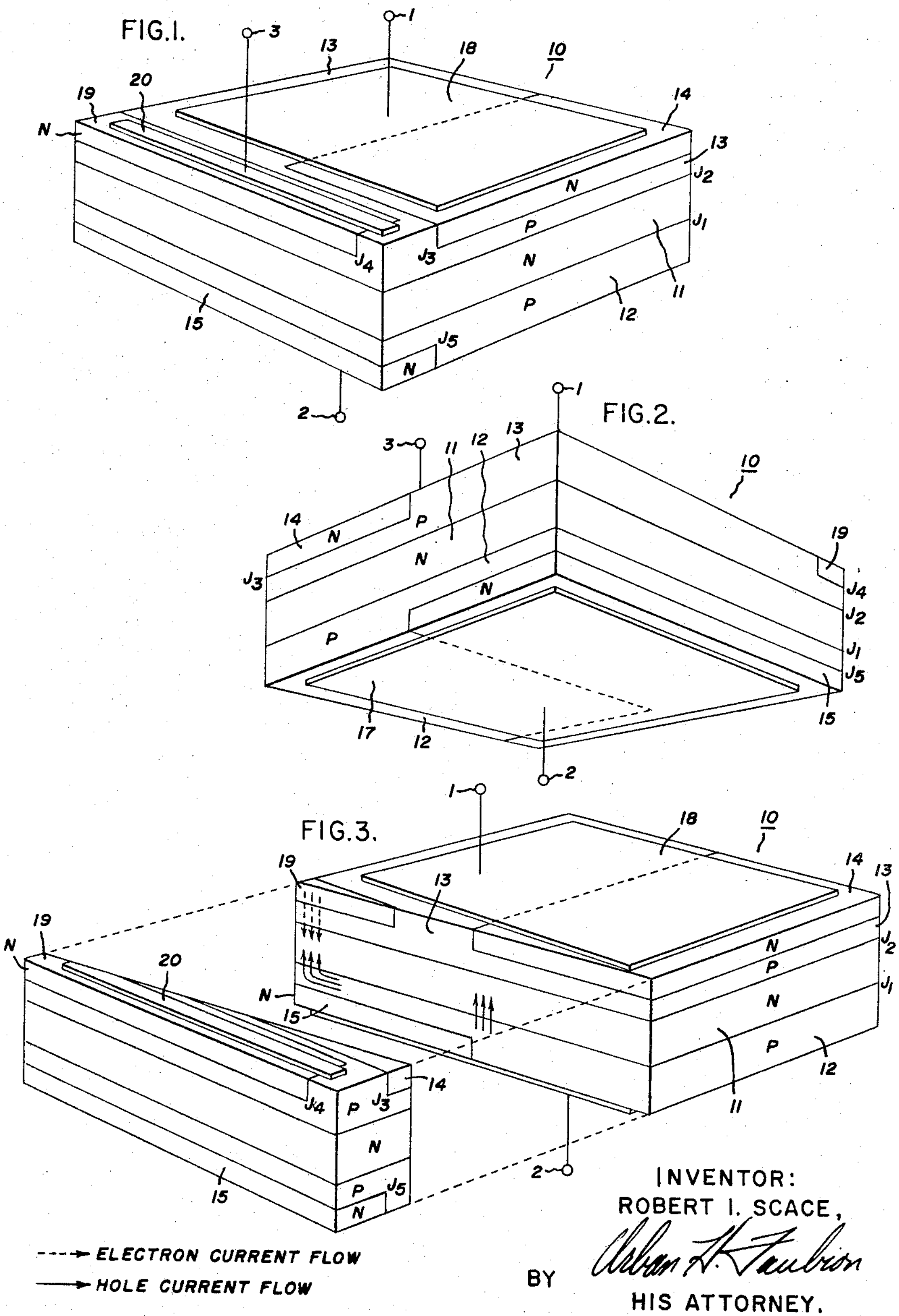
Figures 4, 5, 6, 7:
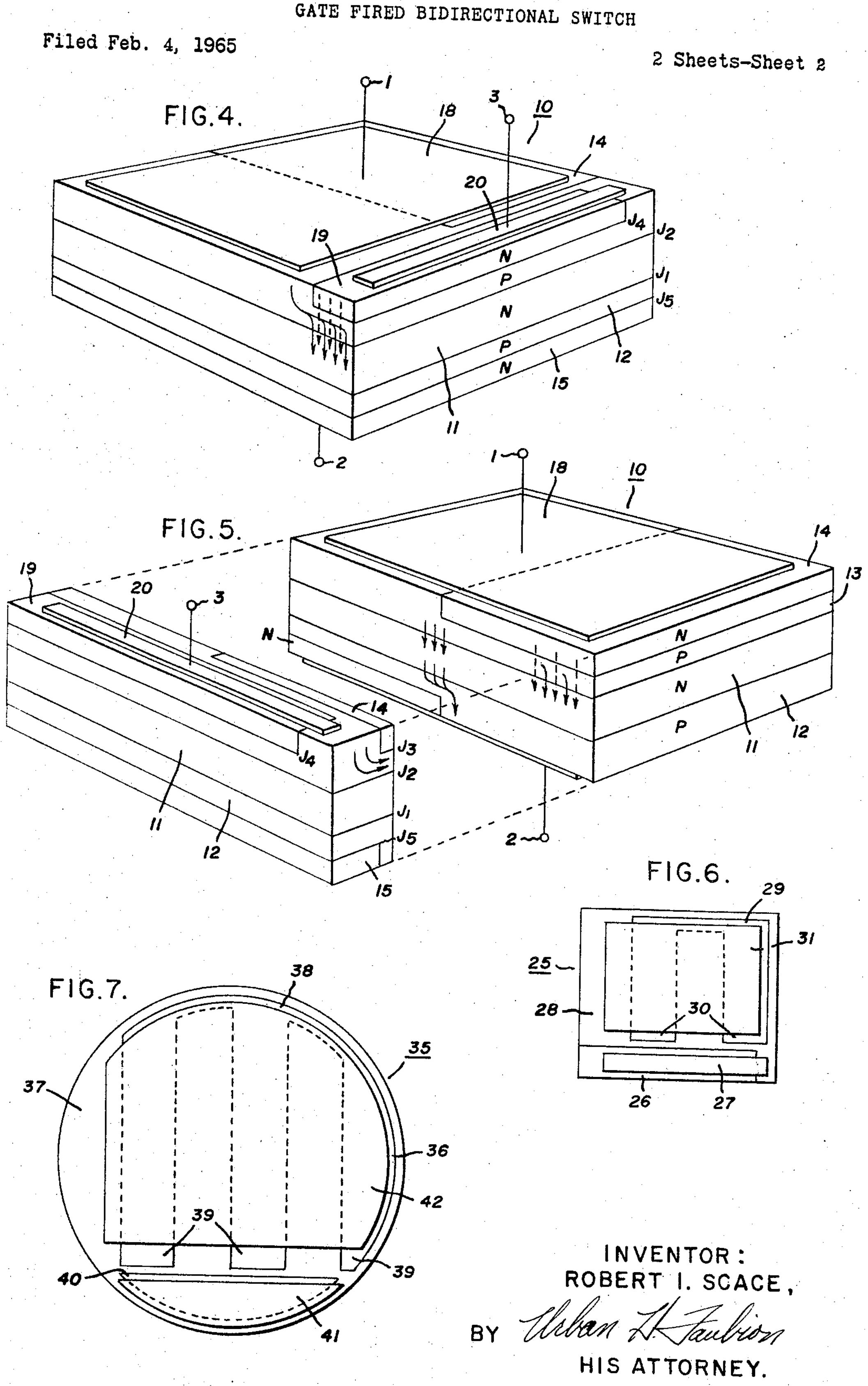

FIGURE 5 is a cut away and exploded three-dimensional view of the device of FIGURE 1 with the section taken along the V—V plane of FIGURE 1, with the same projection as that of FIGURE 1 and showing current conduction paths for still a third turn on mode; and FIGURES 6 and 7 are plan views showing different device configurations wherein main and gate emitter regions of different construction are shown which take advantage of principles of the present invention.

Referring to the device of FIGURES 1 through 5 (particularly the view of FIGURES 1 and 2) a bidirectional controllable semiconductor switch is illustrated. The switch has three terminals 1, 2 and 3 which are intended to be connected in the circuit wherein the switch is employed. The upper and lower main current carrying terminals 1 and 2 respectively are connected in a main current-carrying path of the circuit and gate terminal 3 is connected to a source which supplies a turn on signal of proper polarity when the current path between the main terminals 1 and 2 is to be rendered highly conductive. The device illustrated is one which can be turned on with either a negative or a positive bias (gate current) relative to upper main electrode 1. Thus, if lower main electrode 2 is either positive or negative relative to upper main electrode 1, either a positive or a negative gate current will trigger the device into conduction.

In the embodiment illustrated in FIGURES 1 through 5 inclusive (unless otherwise specified reference should be had to FIGURES 1 and 2) the semiconductor pellet 10 may be considered a five layer device which has an internal N conductivity type base region or layer 11 and outer P conductivity type regions or layers 12 and 13 on opposite sides. The two P type layers 12 and 13 perform different functions for conduction in opposite senses through the pellet 10. For example, when the lower main terminal 2 is positive relative to upper main terminal 1, the lower (i.e., lower in the figure) P type layer 12 operates as an emitter and the junction $J_1$ between the lower P type layer 12 and internal N type layer 11 is considered an emitter junction. Under these conditions, the upper (internal) P type region 13 constitutes a base region which is separated from the N type base region 11 by junction $J_2$. When the polarity between the main terminals is reversed (upper main terminal 1 positive relative to lower main terminal 2) the upper P type layer 13 constitutes an emitter and the lower P type layer 12 constitutes an internal base layer.

An upper N conductivity type region or layer 14 is formed adjacent or contiguous with a portion of the internal P type base layer 13 and is separated therefrom by a rectifying junction $J_3$. As illustrated, this N type region 14 is essentially rectangular (plan view) and takes up one corner of the upper major face of the semiconductor pellet or body 10. Thus, the upper N type region is formed in the next adjacent region (outer or upper P type region 13) so that it leaves an essentially L-shaped portion of the next adjacent region exposed at the upper major surface of the pellet. When the lower device terminal 2 is positive relative to upper terminal 1, upper N type region 14 constitutes an emitter region and the adjacent junction $J_3$ an emitter junction. Hence, upper N type region 14 is referred to as a main emitter region. It constitutes part of the total device main current path but does not constitute a part of the active main current path of the device for conduction in the opposite direction.

In order to provide a corresponding emitter and emitter junction for conduction in the opposite sense (i.e., upper terminal 1 positive with respect to lower terminal 2), lower N conductivity type region 15 (see FIGURE 2) is formed adjacent or contiguous with a part of lower P type region 12 and forms a rectifying junction $J_5$ (emitter junction for this polarity). The lower N type region 15, as illustrated, is L-shaped like the portion of the upper L-shaped portion of upper P conductivity type outer region 13 which is not occupied by upper N type main emitter region 14. Lower L-shaped N type region 15 further occupies the portion of the pellet lower major face which is directly under the correspondingly L-shaped portion of upper P type region 13 as described.

The contacts for the main current conduction path through the device are made by providing low resistance ohmic contacts 17 and 18 on the lower and upper major faces respectively of pellet 10. The lower electrode or contact 17 is essentially rectangular in shape and, as shown, contacts substantially the entire lower pellet surface including both the lower external N type region and the exposed portion of the next adjacent (lower) P type region 12. Thus, lower electrode 17 shorts the junction $J_5$. The upper main electrode 18 is also substantially rectangular and extends over the external N type emitter region 14 and the exposed portion of upper P type region 13 immediately adjacent thereto and which describes one leg of the L-shaped exposed part of the next adjacent upper P type region 13. Thus, upper main current carrying contact 18 shorts a portion of upper emitter junction $J_3$ which intersects the upper major surface of pellet 10 and defines (covers) a portion of the upper surface which may be described as a total device main current carrying area. The electrodes 17 and 18 are electrically connected to main terminals 2 and 1 respectively.

The structure thus far described may, in effect, be considered as essentially two PNPN sections in parallel but arranged in opposite order so that each of the PNPN sections acts as a four layer diode for current conduction in the opposite direction. This arrangement may best be seen in FIGURES 2 and 5 and considering only the area directly under the upper main electrode 18. Thus, in FIGURE 2, this paralleled arrangement may be observed by considering the edge of pellet 10 presented to the front and left of the figure. In FIGURE 5, the part of the body considered is that which appears in the broken away portion to the rear. The central N type region 11 and in surrounding outer P type regions 12 and 13 are common to both diodes. The N type main emitter regions 14 and 15 (upper and lower respectively in FIGURE 2) each constitute the remaining region for one of the parallel connected PNPN diodes.

These parallel connected PNPN diodes correspond to the bidirectional diode switch described and claimed in the copending patent application Ser. No. 838,504 entitled "Semiconductor Devices and Methods of Making Same," filed Sept. 8, 1959 in the name of Nick Holonyak, Jr. and Richard W. Aldrich and assigned to the assignee of the present invention. To obtain an understanding of some of the terminology employed and also the operation of the device, consider an alternating voltage source connected across main current carrying terminals 1 and 2. Assume the structure to be in the "on" state during both alternations of the source voltage. When terminal 1 is positive relative to terminal 2, conduction takes place under the portion of main current carrying electrode 18 which contacts outer P type region 13 (upper in FIGURE 2), hence this portion is considered the main current carrying portion for this polarity. For main terminal 1 negative relative to terminal 2 the oppositely poled PNPN structure conducts in the opposite direction. Thus, the main emitter region 14 as contacted by main electrode 18 (and the region under it in FIGURE 2) becomes the main current carrying area. For conduction in both directions between main current carrying terminals 1 and 2 the entire area contacted by the main electrodes 17 and 18 at the respective major surfaces is considered main current carrying area.

Triggering of this two-terminal configuration from the blocking to conducting state can be accomplished by letting the voltage exceed the avalanche breakdown potential of the blocking junction, by rapidly raising the applied voltage ($dv/dt$), by raising the device temperature or by exposing it to high-intensity light. For purposes of illustration, suppose terminal 2 is to be positive with respect to terminal 1. In this case, junction $J_2$ is the blocking junction. If the avalanche breakdown voltage of $J_2$ is exceeded, avalanche multiplication will cause the current through the device to increase. Holes emitted from forward biased junction $J_1$ diffuse across the N type base region 11, are collected at $J_2$, and thence flow transversely to electrode 18. When this lateral base current in outer P type region 13 becomes sufficiently large to cause a potential drop of a few tenths of a volt there, N type region 11 begins to inject electrons into P type region 13 with the result that the section of the structure including N type region 14, P type region 13, N type region 11, and P type region 12 switches to the "on" state. This is an important characteristic of bilateral semiconductor switches—if the avalanche breakdown voltage of the blocking junction is exceeded (e.g., from transient voltage surges), the device simply switches to the conducting state for either polarity of applied voltage. Triggering by light, temperature and $dv/dt$ have a similar effect; as the current through the device increases, the laterally flowing current builds up sufficient voltage across the shorted emitters to cause carrier injection and subsequent turn on. In the cases of high temperature high light intensity, hole-electron pairs created in the base regions cause the increased current. With $dv/dt$ the triggering current results from the displacement of charge from the depletion region as voltage builds up across the blocking junction causing an increase in current density and subsequent turn on of the device.

In order to provide gate control, an N type gate emitter region 19 is provided adjacent to the portion of upper P type region 13 and near both the upper (in FIGURE 1) external N type emitter region 14 and the portion of region 13 with which the upper main electrode 18 makes contact. The rectifying junction defined between the upper N type gate region 19 and adjacent P type region 13 is designated as $J_4$. A low resistance ohmic contact or electrode 20 is formed on the gate region 19 in order to provide a means of electrical connection to gate terminal 3. The gate contact 20 extends over the gate emitter junction $J_4$ and also contacts the adjacent upper P type region 13 to provide additional firing modes as described in more detail subsequently. It will be noted that a line extended along the portion of the intersection of main emitter junction $J_3$ which is shorted with the major face of the semiconductor body 10 passes over the portion of the next adjacent P type region 13 in which the gate emitter region 19 and gate electrode 20 are positioned. The significance of this point is that the gate region is brought closer to the main current conduction areas for both directions of current flow than is possible with most other arrangements. For example, most other structures provide that the gate firing region be positioned so that a main current conduction area of the device for one conduction direction is between the gate firing region and the area of main current conduction for the opposite direction of current flow through the device.

Application of a small gate voltage of either polarity relative to main electrode 18 results in hole current flow in an ohmic path between the portions of the gate electrode 20 and main electrode 18 which are both in contact with outer P type region 13. Only a slender strip of outer P type region 13 separates gate emitter region 19 from main emitter region 14. Some current also flows in the portions of outer P type region 13 which underlie the main and gate emitter regions 14 and 19. In one series of practical devices, the resistance of the path between main electrode 18 and the gate electrode 20 ranges from 100 to 200 ohms; thus, a current of 5 milliamperes through this region is adequate to raise the potential between main electrode 18 and gate electrode 20 to a voltage greater than 0.5 volt. If the gate terminal 3 is negative with respect to terminal 1, electrons will be injected from gate emitter junction $J_4$ along the edge of main electrode 18 adjacent the gate region and outer P type region 13. If the gate terminal 3 is positive, $J_4$ is reverse biased everywhere and electron emission will be from main emitter junction $J_3$ close to the gate region.

With the aid of FIGURES 1 through 5 inclusive we may examine the various device turn-on modes. For example, with main current carrying terminal 2 positive relative to terminal 1 and gate terminal 3 positive relative to main terminal 1, the turn-on process is strictly analogous to that of a conventional controlled rectifier. Because lower (in FIGURE 1) main emitter junction $J_5$ is slightly reverse biased, it plays no significant role in this case.

For the condition with main current carrying terminal 2 positive relative to terminal 1 and gate terminal 3 negative relative to main terminal 1, gate emitter junction $J_4$ is forward biased. Consequently, electrons are injected from N type gate emitter region 19 into the next adjacent P type region 13. For these bias conditions the broken-away three-dimensional view of FIGURE 3 best illustrates the hole and electron current flow. Electrons which are emitted by N type gate emitter region 19 serve to lower the potential of the central N type region 11 with respect to outer P type region 12 and thus forward bias the intervening junction $J_1$. However, the junction $J_5$ between the lower (in FIGURE 3) outer P type region 12 and lower N type emitter region 15 forces the holes which cross junction $J_1$ under gate emitter region 19 (see solid arrows in FIGURE 3) to flow laterally between junctions $J_1$ and $J_5$ in the region between the lower N type emitter 15 and central N type region 11. The resulting voltage drop causes hole injection from lower outer P type region 12 into the central N type region 11 under the upper N type emitter region 14. The mode of switching from this point is dependent upon the relative resistances of the internal N type region 11 and outer P type region 12. However, in either case, the right hand portion of the device composed of upper N type emitter 14 next adjacent P type region 13, internal N type region 11 and lower P type region 12 switches to the conducting state. Holes can flow laterally between junction $J_1$ and $J_5$ and the section of the device composed of lower P type region 12, internal N type region 11, upper P type outer region 13, and upper N type gate emitter region 19 can begin to turn on. When the current begins to increase, more holes will be injected from the lower outer P type region 13 into internal N type region 11 causing the right hand portion of the device constituting lower outer P type region 12, internal N type region 11, upper outer P type region 13 and upper main emitter 14 to switch into conduction. Alternatively, the other mode of switching would occur if the PNPN section of the device composed of the right hand portion just described began switching prior to the section including the upper gate emitter region 19 as previously described. In either case, the right hand portion of the device as described (FIGURE 3) switches to the conducting state.

For the condition with main terminal 2 negative relative to main terminal 1 and gate terminal 3 is also negative relative to gate terminal 1 the gate emitter junction $J_4$ is forward biased. Consider the hole and electron current flow indicated in FIGURE 4. Note, as is used throughout, the electron current is designated by broken line arrows and hole current by solid line arrows. Since the main terminal 2 is negative with respect to main terminal 1, the electrons which are collected by the junction $J_2$ between outer P type region 13 and internal N type region 11 cause the internal N type region 11 to become more negative; the result is that the junction $J_2$ injects holes from upper P type region 13 into internal N type region 11. When sufficient base drive is delivered to internal N type base region 11, the section of the device which is composed of outer P type region 13, internal N type region 11, outer P type region 12, and lower emitter region 15 will trigger into conduction.

For the upper main terminal 1 positive relative to main terminal 2 and gate terminal 3 positive relative to main terminal 1, the mode of operation is best seen considering the broken away view of FIGURE 5. In view of the fact that the gate terminal 3 is positive relative to main terminal 1, the gate emitter junction $J_4$ is reverse biased and thus, inactive. In view of the fact that terminal 2 is negative relative to main terminal 1, electrons are injected from the main emitter region 14 through main emitter junction $J_3$ into the next adjacent P type base region 13. The electrons so injected are collected by the next junction $J_2$ (i.e., junction between outer P type base region 13 and internal N type region 11). This lowers the potential of internal N type base region 11 with respect to outer P type base region 13 with the result that the intervening junction $J_2$ becomes more forward biased. Holes are injected as indicated by the solid line arrows generally along the right side of the structure as illustrated and diffuse toward the junction $J_1$ between internal N type base region 11 and outer P type region 12;

these holes are supplied by a hole current flow in upper P type region 13 along a path starting at the upper terminal 1 near the left side of upper main emitter 14 and following upper P type region 13 to the right, between junctions $J_3$ and $J_2$, until the point of hole injection is reached. This hole current causes a voltage drop in this path which additionally forward biases junction $J_2$ and results in the point of hole injection being moved from the extreme right side of the pellet to the vicinity of the extreme left side of upper main emitter region 14 (regions of conduction shown by arrows on the figure). As the current density increases, these holes diffuse across inner N-type region 11 and are collected by junction $J_1$ opposite the point of their injection. When hole injection across junction $J_2$ finally reaches point C, upon collection by $J_1$ the holes flow laterally in lower P type region 12 and cause a lateral voltage drop in the lower outer P type region 12 between junctions $J_1$ and $J_5$ ($J_5$ is the lower main emitter junction). When this voltage reaches a few tenths of a volt, electrons are injected by lower main emitter 15 and the portion of the device which includes upper P type region 13, internal N type region 11, lower P type region 12 and lower N type emitter region 15 switches to the "on" state.

For all of the various switching modes, the active gate region of the device is located to provide for the shortest possible current interchange with the total main conduction path of the device for conduction in both directions. This is the basic principle involved in the present invention.

A number of variations of main and gate emitter patterns are possible still incorporating the principles of the present invention. For example, in FIGURE 6 the plan view of an essentially rectangular pellet 25 with an emitter structure which might be termed interdigital is shown. The device is intended to have the same number of regions to provide bi-directional conduction. That is, like the device of FIGURES 1 through 5 inclusive, the device of FIGURE 6 has a central region (not shown) bounded on opposite sides by outer regions of like conductivity type which is opposite to that of the central region (only one outer region 28 is shown). The main emitter regions are formed in the outer regions (only one main emitter region 29 is visible). As described in connection with the previous embodiment, the main emitter region on the opposite side of the pellet preferably has the same configuration as the upper face of the semiconductor body except for that portion which is covered by the upper main emitter (29 here). Therefore, only the plan view is illustrated.

In the device of FIGURE 6, the gate emitter region 26 is an essentially rectangular region formed in the rectangular pellet along one edge of the device and the location of the gate emitter electrode 27 is indicated in dotted lines on the surface. Notice as in the previously discussed embodiment the gate electrode 27 extends over the gate emitter region 26 and also on to the upper surface of the next adjacent region 28 in which the gate emitter is formed. A main emitter region 29 which is of the same conductivity type as the gate emitter region and opposite to that of the next adjacent region 28 is formed in the next adjacent region 28. This particular main emitter region 29 is an integral structure having a generally comb-like structure with teeth or finger-like portions 30 extending toward the main gate region and spaced apart so that a portion of the next adjacent region 28 is incorporated therebetween. A main emitter electrode 31 indicated by the broken lines is shown. The main emitter electrode, in accordance with the teachings of the present invention, extends over a major portion of the main emitter region and also a portion of the next adjacent region 28 to form what is called a shorted emitter structure. Here, as in the other structures illustrated, the main emitter region 29 and the next adjacent region 28 are, in effect, current paths for different directions of current flow through the pellet 25. Further, in accordance with the teachings of the present invention, the gate region is located so that it is close to both main current conduction paths for current through the device in both directions.

Another interdigital type structure which incorporates the teachings of the present invention is illustrated in FIGURE 7. Again, only the plan view is shown since the invention is primarily related to the location of the gate emitter and gate contact relative to the device main current conduction path and the general location of the other regions in the device body are intended to be in accordance with the teachings already described. Here, the semiconductor pellet 35 is round and the main emitter region 36 is formed in the next adjacent region 37 so that it is essentially comb-shaped and conforms to the general outline of the circular pellet 35 along one side and the back. Thus, the main emitter region has a back portion 38 that is relatively narrow and extends in an arc corresponding to but inside the circumference of the next adjacent region 37 and in addition, it has tooth-like portions 39 which extend across the upper major surface of the pellet toward a gate emitter region 40 which, as illustrated here, has the configuration of a segment of a circle (here a segment of the circle which defines the outer periphery of the comb-like main emitter region 36). A gate electrode 41 is formed on the gate emitter region and extends over to contact the next adjacent region 37. The extension of the gate emitter region is toward the outer periphery of the pellet. Also, a main electrode 42 is formed on the upper surface in such a manner that it covers a major portion of the main emitter region 36 and extends over at least the next adjacent region 37 between the tooth-like projections 39 of the main emitter region. As illustrated, the main electrode 42 constitutes a segment of a circle which is smaller in diameter than a circle defined by the outer periphery of the main emitter region 36. In practice, this electrode may be made large enough to contact the portion of the next adjacent region 37 between the circular outer periphery of main emitter region 36 and the pellet periphery.

Many minor modifications in the structure may be proposed while not departing from the present invention. Thus, while particular embodiments are illustrated, the invention is not limited thereto and it is contemplated that the appended claims will cover such modifications as fall within the true spirit and scope of the invention.

What I claim as new and desire to secure by Letters Patent of the United States is:

1. In a bidirectional switching device wherein a gate electrode provides the control for switching the device between non-conducting and conducting states for a current path between a pair of main current carrying electrodes, a semiconductor body having a plurality of alternating regions, adjacent regions being of opposite conductivity type separated by rectifying barriers, one of said regions adjacent one major surface of said body constituting a main emitter, said main emitter formed in the next adjacent region in such a manner that a portion of said next adjacent region is exposed at said one surface, one main current carrying electrode in ohmic contact with said one major surface of said body and extending over at least a portion of both said main emitter and said next adjacent region thereby defining a load current carrying area, a gate emitter region of the same conductivity type as said main emitter region formed in said next adjacent region adjacent said one surface of said body, a gate electrode ohmically connected to both said gate emitter region and said next adjacent region and positioned so that one edge which extends over both said gate emitter region and said next adjacent region is everywhere equidistant from one edge of said main electrode which extends over both said main emitter region and said next adjacent region.

2. In a bidirectional switching device wherein a gate electrode provides the control for switching the device between non-conducting and conducting states for a current path between a pair of main current carrying electrodes, a semiconductor body having two major surfaces and a plurality of alternating regions, adjacent regions being of opposite conductivity type separated by rectifying barriers, one of said regions adjacent one major surface of said body constituting a main emitter, said main emitter formed in the next adjacent region in such a manner that a portion of said next adjacent region is exposed at said one surface, one main current carrying electrode in ohmic contact with said one major surface of said body and extending over at least a portion of both said main emitter and said next adjacent region thereby extending over at least one intersection with the surface of the rectifying barrier between said main emitter region and said next adjacent region which defines a main emitter short, the area of said semiconductor body contacted by said main current carrying electrode constituting a load current carrying area, a gate emitter region of the same conductivity type as said main emitter region formed in said next adjacent region adjacent said one major surface of said body and located adjacent a side of said main current carrying electrode traversed by a line projected along the said intersection of the rectifying barrier between said main emitter region and said next adjacent region, and a gate electrode ohmically connected to both said gate emitter region and said next adjacent region.

3. A bidirectional switching device as defined in claim 2 wherein said body of semiconductor material has three contiguous regions forming an internal region of one conductivity type bounded on opposite sides by two outer regions of the opposite conductivity type, a first one of said outer regions comprising the said next adjacent region, a second main emitter region formed in the second one of said two outer regions at said second major face and having a conductivity type opposite to that of said second outer region, said second main emitter region having the general configuration of the portion of said next adjacent region which is not occupied by said first main emitter region and located directly opposite the said next adjacent region and said gate emitter region on the opposite major face of said body, and a second main current carrying electrode in ohmic contact with both said second main emitter and said second outer region at said second major surface.

4. In a bidirectional switching device wherein a gate electrode provides the control for switching the device between non-conducting and conducting states for a current path between a pair of main current carrying electrodes, a semiconductor body having a pair of opposed major faces and a plurality of alternating regions therebetween, adjacent regions being of opposite conductivity type separated by rectifying barriers, a pair of main current carrying electrodes on opposite major faces of said device each covering and in ohmic contact with substantial areas but not the entire area of both said major faces and jointly defining the device main load current carrying area, a gate electrode in ohmic contact with one of said major faces and spaced from the one main electrode on said one major face, whereby one edge of said gate electrode opposes and substantially corresponds in shape to one edge of the said one main electrode, one of said alternating regions constituting a main emitter region of opposite conductivity type to the next adjacent region formed in the said one major surface of said body in the next adjacent region and under the said one main electrode in such a manner that an intersection with said one major surface of the rectifying junction between said regions extends under the said one edge of said one main electrode whereby the main current carrying area includes a substantial portion of both regions and the projection of a line along said intersection intersects said gate electrode, and a gate emitter region of the same conductivity type as said main emitter region formed in said one major face in such a way that a portion thereof lies under said gate emitter electrode and in such a manner that said gate electrode contacts said gate emitter region and said next adjacent region, and an intersection of the said rectifying junction with said one major face extends between at least a portion of said one edge of said gate electrode and said one edge of said main current path.

5. In a bidirectional switching device wherein a gate electrode provides the control for switching the device between non-conducting and conducting states for a current path between a pair of main current carrying electrodes, a semiconductor body having a plurality of alternating regions, adjacent regions being of opposite conductivity type separated by rectifying barriers, one of said regions adjacent one surface of said body constituting a main emitter, said main emitter formed in the next adjacent region and having a substantially rectangular configuration of such size and location relative to said one surface as to leave a portion of said next adjacent region exposed which is of a generally L-shaped configuration, a substantially rectangular main current carrying electrode in ohmic contact with said one surface of said body and extending over at least a portion of said main emitter and one leg of said exposed L-shaped next adjacent region thereby extending over one intersection with the body surface of the rectifying barrier between said main emitter region and said next adjacent region defining a shorted emitter junction, a substantially rectangular gate emitter region spaced from and of the same conductivity type as said main emitter and formed in the remaining leg of said L-shaped next adjacent region and positioned so that an extension of a line along said shorted emitter junction intersects said gate emitter region, and a gate electrode ohmically connected to said gate emitter region and said next adjacent region.

6. A bidirectional switching device as defined in claim 5 wherein said body of semiconductor material has three contiguous regions forming an internal region of one conductivity type bounded on opposite sides by two outer regions of the opposite conductivity type, a first one of said outer regions comprising the said next adjacent region, a second main emitter region formed in the second one of said two outer regions at said second major face and having a conductivity type opposite to that of said second outer region, said second main emitter region having the general configuration of the portion of said next adjacent region which is not occupied by said first main emitter region and located directly opposite the said next adjacent region and said gate emitter region on the opposite major face of said body, and a second main current carrying electrode in ohmic contact with both said second main emitter and said second outer region at said second major surface.

7. In a bidirectional switching device wherein a gate electrode provides the control for switching the device between non-conducting and conducting states for a current path between a pair of main current carrying electrodes, a semiconductor body having a pair of major surfaces and a plurality of alternating regions therebetween, adjacent regions being of opposite conductivity type separated by rectifying barriers, one of said regions adjacent one major surface of said body constituting a main emitter, said main emitter formed in the next adjacent region and having an essentially comb-shaped configuration on said one major surface as defined by the intersection at said one surface of the rectifying barrier between said main emitter and said next adjacent region, said comb-like configuration being comprised of a back portion along one edge of said body and at least two spaced apart tooth-like portions extending away from said back portion and leaving an exposed portion of said next adjacent region therebetween, a main current carrying contact in ohmic contact with said one major surface over a substantial portion of said main emitter region and a substantial portion of said next adjacent region between said spaced apart tooth-like portions thereby defining a main current carrying area, a gate emitter region of the same conductivity type as said main emitter region formed in said next adjacent region and adjacent said one surface of said body, said gate emitter region being spaced from said main emitter region and said main current carrying contact, and a gate electrode ohmically connected to both said gate emitter region and said next adjacent region.

8. A bidirectional switching device as defined in claim 7 wherein said body of semiconductor material has three contiguous regions forming an internal region of one conductivity type bounded on opposite sides by two outer regions of the opposite conductivity type, a first one of said outer regions comprising the said next adjacent region, a second main emitter region formed in the second one of said two outer regions at said second major face and having a conductivity type opposite to that of said second outer region, said second main emitter region having the general configuration of that portion of said next adjacent region which is not occupied by said first main emitter region and located directly opposite the said next adjacent region and said gate emitter region on the opposite major face of said body, and a second main current carrying electrode in ohmic contact with both said second main emitter and said second outer region at said second major surface.

9. In a bidirectional switching device wherein a gate electrode provides the control for switching the device between non-conducting and conducting states for a current path between a pair of main current carrying electrodes, a semiconductor body having a pair of major surfaces and a plurality of alternating regions therebetween, adjacent regions being of opposite conductivity type separated by rectifying barriers, one of said regions adjacent one major surface of said body constituting a main emitter, said main emitter formed in the next adjacent region and being comprised of a unitary structure including at least two tooth-like portions which extend so as to be spaced apart and leaving an exposed portion of said next adjacent region therebetween, a main current carrying contact in ohmic contact with said one major surface over a substantial portion of said main emitter region and a substantial portion of said next adjacent region between said spaced apart tooth-like portions thereby defining a main current carrying area, a gate emitter region of the same conductivity type as said main emitter region formed in said next adjacent region and adjacent said one surface of said body, said gate emitter region being spaced from said main emitter region and said main current carrying contact, and a gate electrode ohmically connected to both said gate emitter region and said next adjacent region.

References Cited

UNITED STATES PATENTS

| | | | |
|---|---|---|---|
| 2,971,139 | 2/1961 | Noyce | 317—235 |
| 3,040,196 | 6/1962 | D'Asaro | 307—88.5 |
| 3,123,750 | 3/1964 | Hutson et al. | 317—235 |

JOHN W. HUCKERT, *Primary Examiner.*

RONALD F. SANDLER, *Assistant Examiner.*

Disclaimer 3,350,611.—*Robert I. Scace*, Skaneateles, N.Y. GATE FIRED BIDIRECTIONAL SWITCH. Patent dated Oct. 31, 1967. Disclaimer filed Nov. 26, 1973, by the assignee, *General Electric Company*.

Hereby enters this disclaimer to claims 1, 2, 3, 4, 5, 6, 7, 8 and 9 of said patent.

[*Official Gazette January 8, 1974.*]